June 10, 1930.  L. E. SHONE  1,762,198
AUTOMATIC LUBRICATOR FOR VEHICLES
Filed Nov. 15, 1926     2 Sheets-Sheet 1
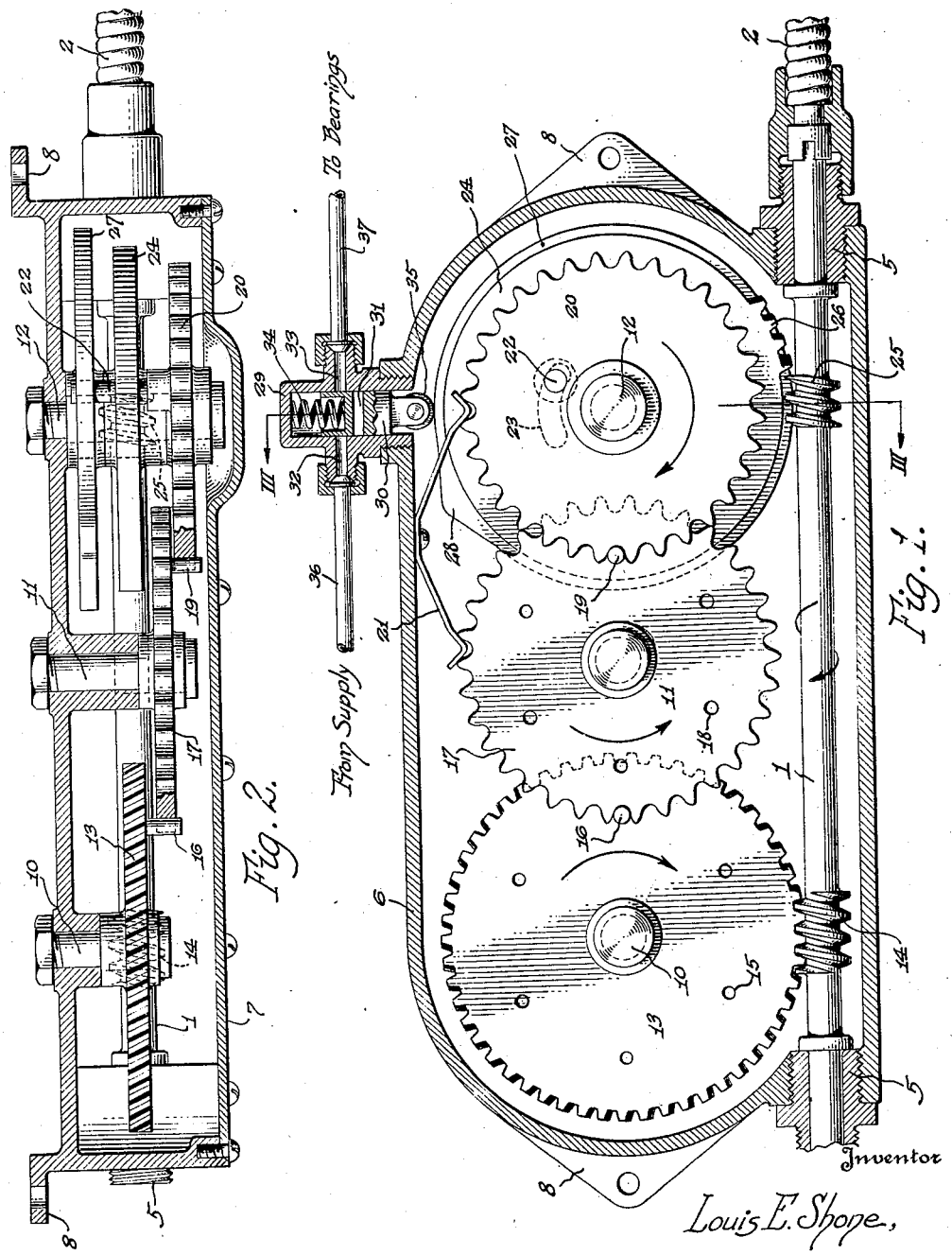
Inventor
Louis E. Shone,
By
Attorney June 10, 1930. L. E. SHONE 1,762,198
AUTOMATIC LUBRICATOR FOR VEHICLES
Filed Nov. 15, 1926 2 Sheets-Sheet 2
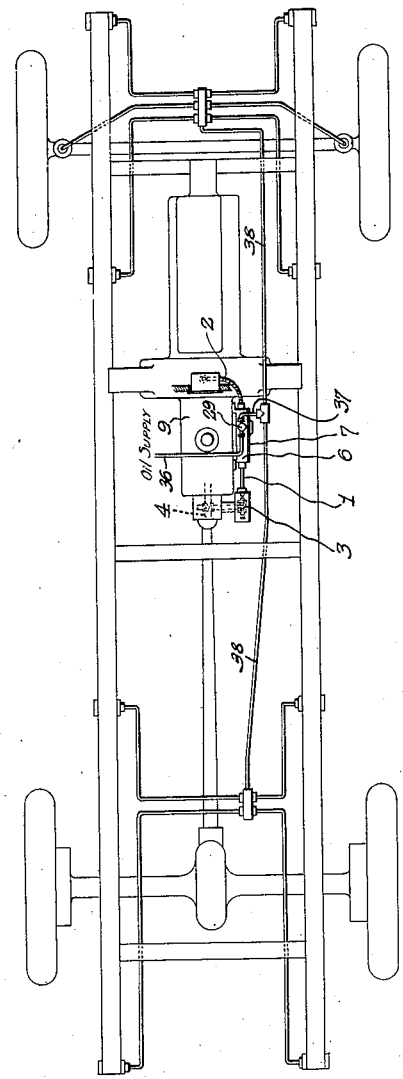
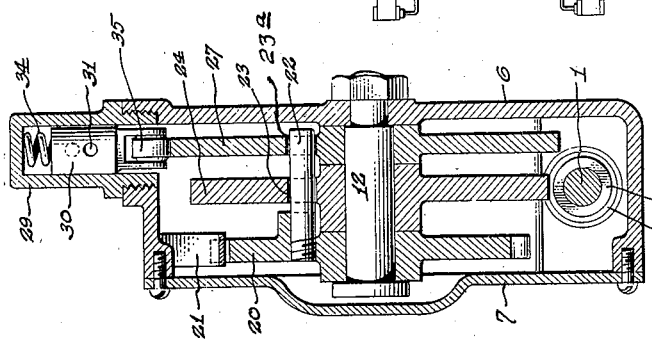
Inventor
Louis E. Shone,
By
Attorneys Patented June 10, 1930

1,762,198

UNITED STATES PATENT OFFICE

LOUIS E. SHONE, OF HIGHLAND PARK, MICHIGAN

AUTOMATIC LUBRICATOR FOR VEHICLES

Application filed November 15, 1926. Serial No. 148,374.

My invention aims to provide an automatic lubricator for vehicles and particularly motor driven vehicles, as trucks and automobiles which have many bearings and other parts requiring lubrication. In a great many instances the owner of an automobile is instructed to oil or lubricate bearings and other parts after so many miles of travel, which is determined by a speedometer on the automobile. In other instances, a car is furnished with a force feed lubricator that constantly supplies lubricant to bearings or other parts. In the first instance, there is often neglect resulting in excessive wear and tear on automobile parts that should have been lubricated. In the second instance there is often a waste of oil or excessive lubrication and with these conditions in mind I have aimed to provide an automatic lubricator which can be set or timed to deliver predetermined quantities of lubricant when necessary. Since a driven speedometer shaft revolves so many revolutions per mile it can be conveniently used as a source of power for my automatic lubricating mechanism. The speedometer shaft affords a convenient means of obtaining power, but obviously there are other driven parts of an automobile, such as a transmission shaft, from which power may be derived for my purpose.

The automatic lubricating mechanism has been especially designed for a force feed lubricator, gravity or otherwise, in which a valve may control the supply of lubricant to various parts of an automobile, and I have devised a novel timing mechanism that may be adjusted or set to intermittently actuate the valve according to the mileage performance of the automobile.

My invention will be hereinafter specifically described and then claimed and reference will now be had to the drawings, wherein Figure 1 is a vertical sectional view of the automatic lubricating mechanism;

Fig. 2 is a horizontal sectional view of the same;

Fig. 3 is a vertical cross sectional view taken on the line III—III Fig. 1, and

Fig. 4 is a diagrammatic plan of the chassis of an automobile or similar vehicle showing the extent of the lubricating system controlled by my mechanism.

In the drawing, 1 denotes a power shaft which may be interposed in a speedometer shaft 2 so as to be driven in synchronism therewith, or as indicated in Fig. 4 the shaft 1 may be driven by a suitable power transmission 3 from a transmission shaft 4 or some other driven part of an automobile. The shaft 1 is preferably journaled in bearings 5 provided therefor in the lower part of an oblong comparatively flat casing 6 having a detachable side wall 7. The casing 6 may have apertured end lugs 8 to facilitate securing the casing to a suitable support, for instance the transmission housing 9 shown in Fig. 4.

In the casing 6 are a plurality of transversely disposed stationary stud shafts 10, 11 and 12. On the shaft 10 is a worm wheel 13 meshing with a worm 14 on the power shaft 1 so that it may be driven by said shaft. The worm wheel 13 is provided with a plurality of equally spaced openings or sockets 15 in which may be mounted one or more pins or studs 16, one of which has been shown for intermittently meshing with a toothed wheel 17 loosely mounted on the shaft 11. This toothed wheel may have openings or sockets 18 to receive one or more pins or studs 19 adapted to intermittently mesh with a toothed wheel 20 loose on the shaft 12.

Preventing accidental rotation of the toothed wheels 17 and 20 is a resilient detent 21, carried by the casing 6 and engaging teeth of the wheels 17 and 20.

Mounted in the side of the toothed wheel 20 is a coupling pin 22 extending through a segment slot 23 in a segment worm wheel 24 loosely mounted on the shaft 12, at the side of the toothed wheel 20 and adapted to intermittently mesh with a worm 25 on the power shaft 1. The segment worm wheel 24 has a very few worm teeth 26 that are brought into engagement with the worm 25 so that this worm may quickly impart a partial rotation to the segment worm wheel 24 and by virtue of the coupling pin 22 transmit a partial rotation to a cam wheel 27 in which the pin 22 extends, as best shown in Fig. 3. The cam wheel 27 is loose on the shaft 12 and has its periphery provided with a cam 28 (see Fig. 1).

The cam wheel 27 has a slot 23ª similar to the wheel 24 and in some instances the hubs of these wheels may be integral or connected so as to be operable in unison and avoid a long pin 22 and slotting of the cam wheel 27.

Attached to the top of the casing 6 in the vertical plane of the cam wheel 27 is a valve housing 29 for a cylindrical slide valve 30 having a transverse port or passage 31 adapted to communicate with inlet and outlet connections 32 and 33 of the valve housing.

The upper end of the valve 30 is cupped to receive a coiled expansion spring 34 adapted to hold the valve 30 normally lowered and closed by reason of the port or passage 31 having its end closed by the valve housing 29. At the lower end of the valve 30 is an anti-frictional roller 35 normally engaging the periphery of the cam wheel 27 so that the cam 28 may raise the valve 30 and place its port or passage in alinement with the inlet and outlet connections 32 and 33 to permit of a quantity of lubricant passing through the valve housing 29.

Suitably coupled to the inlet connection 32 of the valve body 29 is a lubricant supply pipe 36, which may receive lubricant from a suitable reservoir, a pump or any source from which the lubricant will be forced to the valve housing 29.

Suitably coupled to the outlet connection 33 of the valve body 29 is an outlet pipe 37 that may have branches 38 extending to bearings, shackles, knuckles and any other parts of an automobile or similar vehicle that may require lubrication from time to time. Such lubricant distributing system is somewhat illustrated in Fig. 4 where I have shown an installation of my invention in proximity to the transmission housing of the automobile. In using a valve, it is a fair example of a lubricant control element.

Assuming that automobile parts are to be lubricated after a predetermined mileage performance of the automobile and after succeeding similar performances, the pins or studs 16 and 19 can be set so that power from the shaft 1 will be transmitted to the train of wheels within the casing 6. The relative ratio of this train of wheels being known, also that of the worm wheel 13 to the worm 14, the worm wheel 13 will actuate the toothed wheel 17 once during each revolution and the toothed wheel 17 will actuate the toothed wheel 20 once during each revolution of the toothed wheel 17; it being assumed that but a single pin is used in each of the wheels 13 and 17. As the pin carrying toothed wheel 20 is actuated it carries with it the wheels 24 and 27, but once during each rotation of these wheels the pin 22 shifts the segment worm teeth 26 into operative relation with the worm 25 of the power shaft 1. By virtue of the slots 23 and 23ª there may be a quick actuation of the wheels 24 and 27 from the power shaft. By reference to Fig. 1 the position of the cam 28 relative to the slot 23 will be noted and this relation causes the quick partial rotation of the cam wheel 27 to actuate the valve 30. The valve is raised and opened for such a period of time as to permit a predetermined quantity of lubricant passing through the valve from the supply pipe 36 to the outlet pipe 37 for lubricating purposes.

As a result of my timing mechanism it is only necessary to use one or more pins in connection with each of the wheels 13 and 17 in order to have a desired intermittent operation of the lubricant control valve or element, and obviously this obviates any manual attention to the lubricating system of an automobile other than maintaining a suitable supply of lubricant. There is bound to be a proper timed and quantity lubrication of the automobile which avoids lubricant waste, hot bearings, and assures a higher degree of efficiency in connection with any vehicle.

I desire to direct attention to the fact that the train of wheels, one of which is constantly driven and the others intermittently moved, are employed for conditioning or comparatively positioning a valve operating wheel or member, and that the same means which intermittently actuates the train of wheels also imparts a rapid partial movement to the conditioned valve operating member. Broadly, this is my invention and another aspect thereof is the regulation of the intermittently actuated wheels so that there may be a timed actuation of the valve operating mechanism.

One embodiment of my invention has been illustrated, but it is to be understood that the structural elements are susceptible to such variations and modifications as fall within the scope of the appended claims.

What I claim is:—

1. In an automatic valve adapted to control the flow of oil, a driven shaft, a valve operating wheel, means operated by said shaft and adapted to intermittently actuate said wheel and place said wheel in operative engagement with said shaft for a quick partial rotation for valve operating purposes indepedent of the first mentioned means.

2. In a valve as called for in claim 1, means holding said valve normally closed and adapted to yield under actuation by said valve operating wheel.

3. In an automatic valve controlling the flow of oil, a driven train of wheels, one of which is intermittently actuated and conditioned for operating said valve, and means adapted to impart rapid partial rotation to the conditioned wheel to cause it to operate said valve.

4. In a valve as called for in claim 3, wherein said means is also utilized as a source of power for intermittently actuating one of said wheels.

5. In a valve as called for in claim 3, means in connection with some of said wheels adapted for regulating the intermittent actuation thereof.

6. Valve operating means for a forced feed lubricating system, said means comprising a valve operating wheel, a constantly driven time mechanism adapted to condition said wheel intermittently for valve operation, and means adapted to operate said wheel when conditioned, said driven time mechanism including a train of wheels, one of which is constantly driven and others intermittently moved thereby.

7. In an automatic valve a valve operating member intermittently moved to a position by which it is conditioned for valve actuation, and means adapted for intermittently moving said valve operating member, and means for operating said valve operating member after being conditioned.

8. An automatic valve as called for in claim 7, wherein the last mentioned means includes a train of wheels, one of which is constantly driven and others intermittently moved.

9. In an automatic valve, a normally closed valve controlling the flow of oil, a driven shaft, a timing mechanism operated by said driven shaft, and valve opening means conditioned by said timing mechanism to be actuated by said driven shaft, said timing mechanism including toothed wheels and pins adapted to be set to regulate actuation of said toothed wheels.

10. In a valve as called for in claim 9, wherein said timing mechanism includes toothed wheels and pins adapted to be set to regulate actuation of said toothed wheels.

11. An automatic valve as called for in claim 11, wherein said timing mechanism includes wheels disposed in parallelism, and intermittently moved with one of said wheels adapted for a partial movement independent of the other wheels.

In testimony whereof I affix my signature.
LOUIS E. SHONE.